US012211206B1

(12) United States Patent
Frank (10) Patent No.: US 12,211,206 B1
(45) Date of Patent: *Jan. 28, 2025

(54) MULTISTAGE REGION-OF-INTEREST IDENTIFICATION IN MEDICAL IMAGES (71) Applicant: Steven Frank, Framingham, MA (US)

(72) Inventor: Steven Frank, Framingham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/429,988

(22) Filed: Feb. 1, 2024

Related U.S. Application Data (63) Continuation of application No. 18/388,368, filed on Nov. 9, 2023, now Pat. No. 11,961,234.

(51) Int. Cl.
*G06T 7/00* (2017.01)
*G06T 11/00* (2006.01)
*G06V 10/25* (2022.01)

(52) U.S. Cl.
CPC ............ *G06T 7/0012* (2013.01); *G06T 11/00* (2013.01); *G06V 10/25* (2022.01); *G06T 2207/20084* (2013.01); *G06T 2207/30024* (2013.01); *G06V 2201/07* (2022.01)

(58) Field of Classification Search
CPC .............. G06T 7/0012; G06T 11/00; G06T 2207/20084; G06T 2207/30024; G06V 10/25; G06V 2201/07
See application file for complete search history.

(56) References Cited

U.S. PATENT DOCUMENTS

| 10,832,406 B2 | 11/2020 | Yu |
| 11,195,060 B2 | 12/2021 | Frank |
| 11,854,195 B2 | 12/2023 | Schwartzbard |
| 2005/0169526 A1* | 8/2005 | Romsdahl ............. G06V 10/36 382/128 |
| 2017/0103525 A1* | 4/2017 | Hu ........................ G06T 7/0012 |
| 2019/0139216 A1* | 5/2019 | Georgescu ............. G06N 3/048 |
| 2021/0004560 A1 | 1/2021 | Ding et al. |
| 2021/0004650 A1* | 1/2021 | Frank .................. G06F 18/2415 |
| 2021/0039828 A1 | 2/2021 | Song et al. |
| 2023/0005016 A1 | 1/2023 | MacDonald-Korth et al. |
| 2023/0334660 A1 | 10/2023 | Frank |

OTHER PUBLICATIONS

Baccouche et al., Breast lesions detection and classification via YOLO-based fusion models, Comput. Mater. Contin., 69 (2021), 10.32604/cmc.2021.018461.

(Continued)

*Primary Examiner* — Siamak Harandi (57) ABSTRACT

First and second predictors are used to identify regions of interest in a medical image. The first predictor is configured to maximize precision in identifying one or more abnormalities that it was trained to recognize, or at least to have greater precision than the second predictor. The second predictor is configured or selected to maximize sensitivity (i.e., recall) in identifying one or more abnormalities that it was trained to recognize, or at least to have greater sensitivity than the first predictor. The predictions of the first and second predictors may be used to create a digital map image showing the locations of regions of interest identified by the first and second predictors. Alternatively or in addition, the predictions may be used to rank images or image sets in terms of review priority.

20 Claims, 3 Drawing Sheets

(56) References Cited

OTHER PUBLICATIONS

Baccouche et al., An integrated framework for breast mass classification and diagnosis using stacked ensemble of residual neural networks, Sci. Rep., 12 (2022), p. 12259, 10.1038/s41598-022-15632-6.

Baccouche et al., Early detection and classification of abnormality in prior mammograms using image-to-image translation and YOLO techniques, Comput Methods Programs Biomed . Jun. 2022:221:106884. doi: 10.1016/j.cmpb.2022.106884. Epub May 13, 2022.

Mohiyuddin et al., Breast Tumor Detection and Classification in Mammogram Images Using Modified YOLOv5 Network, Computational and Mathematical Methods in Medicine vol. 2022, Article ID 1359019.

Hamed et al., Deep Learning in Breast Cancer Detection and Classification, Proceedings of the International Conference on Artificial Intelligence and Computer Vision (AICV2020).

Shen et al., Deep Learning to Improve Breast Cancer Detection on Screening Mammography, Sci Rep . Aug. 29, 2019;9(1):12495. doi: 10.1038/s41598-019-48995-4.

Ribli et al., Detecting and classifying lesions in mammograms with Deep Learning, Sci Rep . Mar. 15, 2018;8(1):4165. doi: 10.1038/s41598-018-22437-z.

Hassan et al., Mammogram breast cancer CAD systems for mass detection and classification: a review, Multimed Tools Appl 81, 20043-20075 (2022). https://doi.org/10.1007/s11042-022-12332-1.

\* cited by examiner

MULTISTAGE REGION-OF-INTEREST IDENTIFICATION IN MEDICAL IMAGES

CROSS-REFERENCE TO RELATED APPLICATION

This is a continuation of, and incorporates by reference in its entirety, U.S. Ser. No. 18/388,368, filed on Nov. 9, 2023.

FIELD OF THE INVENTION

The present invention relates, generally, to processing and automated segmentation and classification of medical images.

BACKGROUND

"Deep learning" approaches have been applied to a wide range of medical images with the objective of improving diagnostic accuracy and clinical practice. For example, breast cancer is a leading cause of death for women globally, and various imaging modalities are presently employed to detect abnormalities at the earliest possible stage. Mammography, the most commonly employed modality, has contributed to sharp declines in mortality. Nonetheless, screening mammography misses about 20% of malignancies, often due to high breast density: fibroglandular tissue and tumors have similar density, so the former may hide the latter in a mammogram image. Such interpretive challenges are exacerbated by clinician fatigue, which can reduce accuracy further as radiologists are asked to shoulder ever-increasing workloads. Hence, numerous research efforts have attempted to address these challenges computationally.

Indeed, the objective of much recent work has been to replace clinicians altogether, or to match or exceed human performance according to some benchmark. Even efforts that do not seek explicitly to supplant clinicians may offer predictions that amount to clinical judgments. Recognizing that such systems do not actually reduce clinicians' workloads, developers of "decision-referral" systems seek to spare clinicians from reviewing exams with a high probability of being cancer-free. Not surprisingly, the resulting efficiencies can come at the cost of an unacceptable reduction in sensitivity.

Clinical adoption of machine-learning techniques will depend not only on the trustworthiness of computational analysis but its compatibility with conventional practice and clinical workflows. Efforts to eliminate human expertise from diagnostic procedures are unrealistic and fraught with risk; the ability of clinicians to integrate disparate patient symptoms and test results, and to recognize unobvious, "long tail" disease indications, are themselves sufficient to ensure a permanent role for human expertise in diagnostic medicine.

Artificial intelligence (AI) systems will achieve greater acceptance in medical practice when they assist rather than attempt to replace this expertise. Hence, a persistent need exists for systems and techniques that help clinicians perform accurate analyses of medical images, address the difficult problem of analyst fatigue, and easily integrate with existing practice and workflows.

SUMMARY

Embodiments of the present invention offer decision support by identifying abnormalities, such as diseased regions or anomalous anatomic features, in medical images in a manner consistent with common clinical practice, including human review of every image. The objective is to ensure that, if an abnormality is present, the clinician's attention is efficiently drawn to it. In various embodiments, an abnormality will most often appear within a tightly conforming image zone highlighted as a high-probability region of interest (ROI). A larger, lower-probability ROI may also be defined; if an abnormality is not found within a high-probability ROI, it will likely fall within the lower-probability ROI. So long as the ROIs do not collectively occupy an excessive fraction of the image under study, the reviewing clinician's time may be used more efficiently and effectively. As used herein, the term "abnormality" broadly connotes not only disease or anomalous features, but also distinct, detectable features of diagnostic interest that may, for example, be indicative of a condition or disease.

The approaches discussed herein may be combined with classification analysis so that diseased tissue is not only delineated within an image but also characterized in terms of disease type or subtype. The techniques may be applied large or small medical images, ranging from digital pathology slides to X-rays, mammograms, ultrasound images, and nuclear-medicine images (e.g., MRI and PET). In various embodiments, a first predictor is used to identify the high-probability ROIs. The first predictor is configured or selected to maximize precision in identifying the abnormality or abnormalities it was trained to recognize, or at least to have greater precision than the second predictor. For example, the first predictor may be or comprise one or more neural networks configured for object detection. The predictions (e.g., contours or bounding boxes) of an ensemble of neural networks may be combined, e.g., using weighted boxes fusion, soft nms or other suitable technique.

The second predictor is configured or selected to maximize sensitivity (i.e., recall) in identifying the abnormality or abnormalities it was trained to recognize, or at least to have greater sensitivity than the first predictor. For the second predictor, a source image may be decomposed into smaller subimages such as square or rectangular tiles, which may be sifted based on a visual criterion. The visual criterion may be one or more of image entropy, density, background percentage, or other discriminator. A classifier, such as a convolutional neural network (CNN), an autoencoder or other classification tool for image data, produces tile-level classifications that are aggregated to produce an ROI. The subimages may overlap; greater the degree of overlap, the greater will be the number of images that may contribute to the classification of any particular pixel, thereby potentially increasing the accuracy of the ROI.

Some embodiments utilize a plurality of second predictors each trained using a training set of images differing at least in part from the images of the other training sets. The second predictors are applied to at least some of the subimage regions to produce predictions (e.g., tissue type, or normal vs. abnormal) therefor. A function may be applied to the corresponding predictions to produce a final prediction for each subimage region. For each pixel of the source image contained within each subimage region, the final predictions corresponding to all of the subimage regions containing the pixel are combined, e.g., in a manner that maximizes sensitivity (by, for example, selecting the maximum of the predictions for each pixel).

The entirety of an ROI, or the tiles making up an ROI, may be analyzed for classification, e.g., disease subtyping if this is done. For example, tile-level classification probabilities may be combined using a probability framework (e.g., averaged) to produce a classification prediction.

Two-level predictions as described herein may be obtained for multiple images and used to rank them in terms of review priority—that is, to assist clinicians in ordering their review of images based on an overall suspicion level associated with each image. In some embodiments, the ranking is based on the number of high-precision pixels and the number of high-recall pixels; for example, because of the higher confidence level associated with high-precision pixels, they may be weighted more heavily for priority purposes than high-recall pixels. Three-dimensional (3D) tomographic images may comprise or consist of a series of slices through the anatomy under study; for example, a 3D mammogram (or "tomosynthesis") contains a series of sectional images of the patient's breast obtained along an imaging axis. Each slice of a 3D image may be analyzed to obtain high-precision and high-recall ROIs corresponding to a condition or anatomic feature (e.g., breast masses or calcifications). The slices may be ranked based on the numbers of high-precision and high-recall pixels. Moreover, multiple 3D images may themselves be ranked based on, for example, the numbers of high-precision and high-recall pixels in the highest-ranked slice of each 3D image.

The term "substantially" or "approximately" means ±10%, and in some embodiments, ±5%. Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The headings provided herein are for convenience only and are not intended to limit or interpret the scope or meaning of the claimed technology.

DESCRIPTION OF THE DRAWINGS

The foregoing discussion will be understood more readily from the following detailed description of the disclosed technology, when taken in conjunction with the following drawings, in which.

DESCRIPTION

Figure 1A:
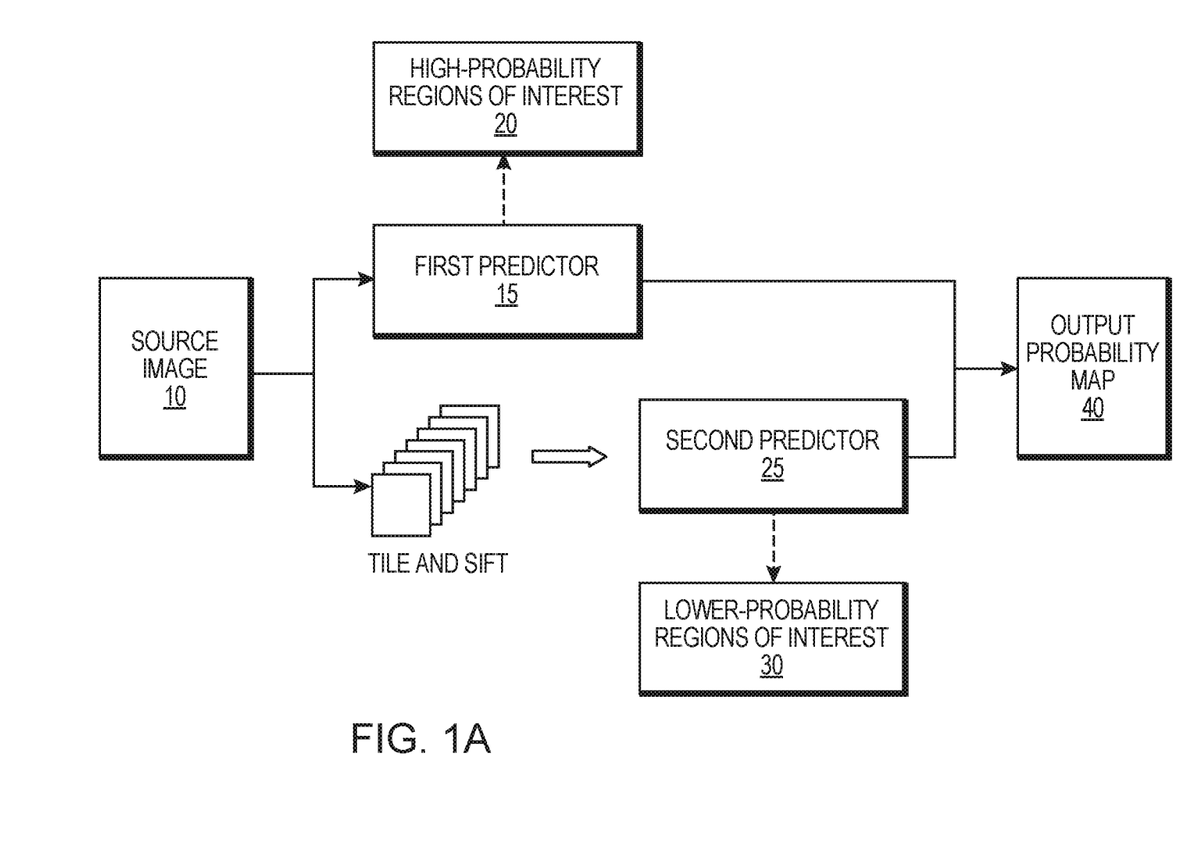
FIGS. 1A and 1B schematically illustrate a representative hardware architectures according to embodiments of the invention.

Refer first to FIG. 1A, which illustrates the basic components of an embodiment of the invention at a high level. A source medical image 10 is processed along two parallel branches. In the top branch, the source image 10 is passed to a first predictor 15 (which may be an object-detection system such as YOLO, as described below), which analyzes the image 10 to identify therein one or more high-probability (e.g., high-precision) ROIs 20. In the bottom branch, the source image 10 is optionally decomposed into tiles sized for processing by a second predictor 25 (which may be a CNN such as EfficientNet, as described below), which generates one or more lower-probability (e.g., high-recall) ROIs 30. Alternatively, if the source image 10 is small enough, second predictor 25 may analyze the entire image.

The high-probability ROIs 20 and the lower-probability ROIs 30 are combined to produce an output probability map 40. Typically, high-probability ROIs 20 take precedence over low-probability ROIs 30 in the output map 40. For example, the ROIs may be differently colored overlays on the source image 10 (or grayscale version thereof). As used herein, the term "take(s) precedence" means that where image components would otherwise overlap, one image component is at least partially rendered (i.e., appears visually in the final image) and the other image component is at least partially not rendered. For example, the pixels of the image component taking precedence may overwrite the pixels of another image component, or the pixels of the other image component may simply not be rendered in the region of overlap. The degree of precedence may be complete or partial. If one image component takes complete precedence, only the pixels of that image component are rendered in regions of overlap with another image component. If the precedence is partial, the pixels of both image regions may be rendered, e.g., as a checkerboard or other blending pattern, which may, if desired, be weighed toward the image component taking precedence.

Figure 1B:
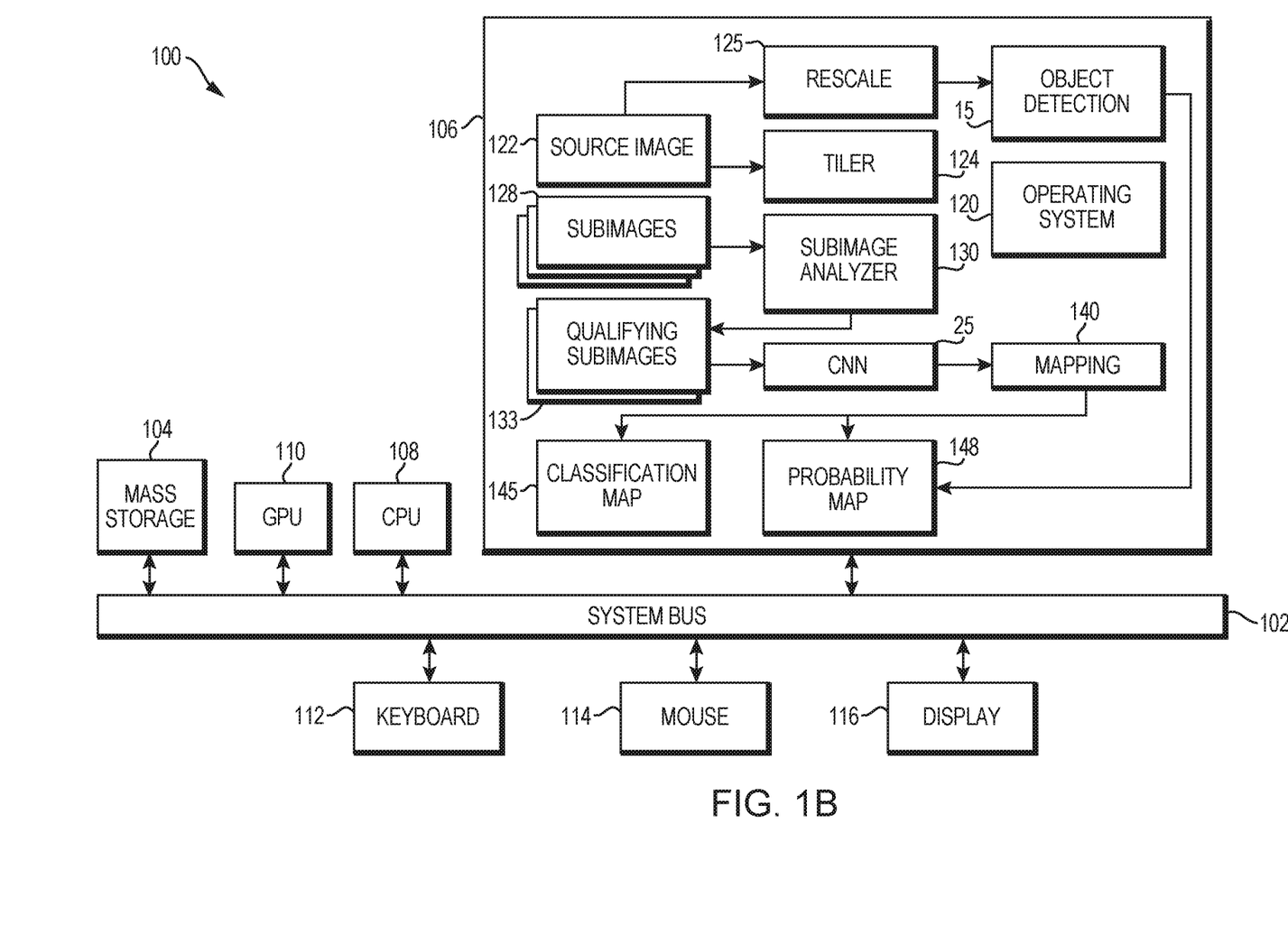

FIG. 1B illustrates a representative system architecture 100 in greater detail. As indicated, the system 100 includes a main bidirectional bus 102, over which all system components communicate. The main sequence of instructions effectuating the functions of the invention and facilitating interaction between the user and the system reside on a mass storage device (such as a hard disk, solid-state drive or optical storage unit) 104 as well as in a main system memory 106 during operation. Execution of these instructions and effectuation of the functions of the invention are accomplished by a central processing unit ("CPU") 108 and, optionally, a graphics processing unit ("GPU") 110. The user interacts with the system using a keyboard 112 and a position-sensing device (e.g., a mouse) 114. The output of either device can be used to designate information or select particular areas of a screen display 116 (which may be a touchscreen) to direct functions to be performed by the system.

The main memory 106 contains instructions, conceptually illustrated as a group of modules, that control the operation of CPU 108 and its interaction with the other hardware components. An operating system 120 directs the execution of low-level, basic system functions such as memory allocation, file management and operation of mass storage devices 104. At a higher level, a source image 122, stored (e.g., as a NumPy array) in an image buffer that may be a partition of main memory 106, is processed along two branches, which may execute sequentially or in parallel. In one branch, the source image 122 is processed by first predictor 15 also shown in FIG. 1A. Particularly if the first predictor 15 is a neural network configured for object detection, the source image 122 may be rescaled by a rescaling module 125. Many object-detection systems include rescaling functionality. Alternatively, the original image scaling may be preserved and source image 122 may be divided into subregions, each of which is analyzed separately by first predictor 15.

Suitable object-detection algorithms for predictor 15 include RCNN, Fast RCNN, Faster RCNN, Mask RCNN, pyramid networks, EfficientDet, RetinaNet, and YOLO (e.g., any of YOLO versions v1-v8, which may be enhanced for detection of small objects with slicing-aided hyperinference). Typically, object-detection algorithms predict the dimensions and locations of bounding boxes surrounding objects that the algorithm has been trained to recognize.

Some, like Mask RCNN, predict object contours. Moreover, object contours may be predicted or estimated within a bounding box using artificial intelligence or computer vision (CV) techniques. Suitable CV algorithms for this purpose include the Harris feature detector, SIFT (scale-invariant feature transform), SURF (speeded-up robust feature), FAST (features from accelerated segment test), BRIEF (binary robust independent elementary features), ORB (oriented FAST and rotated BRIEF), and BRISK (binary robust invariant scalable keypoints).

Bounding boxes or predicted object contours having probability scores below a threshold may be dropped. While object-detection algorithms have proven themselves capable of distinguishing among clearly different object types, they may have more difficulty distinguishing among tissue types whose differences are subtle, or where an image has limited information content. For example, chest X-rays may reveal one or more of numerous conditions such as atelectasis, consolidation, pleural effusion, pulmonary fibrosis, aortic enlargement, cardiomegaly, etc. These conditions may share various visual similarities in an X-ray image, which is not only grayscale but may have limited resolution and/or dynamic range. Similarly, mammograms may contain potentially malignant masses that are difficult to distinguish visually, given the limited dynamic range and absence of color, from fibrous breast tissue. In such cases, it may be useful to apply an ensemble of object-detection algorithms and combine the resulting predictions using a combination technique such as weighted boxes fusion, soft nms, or other suitable technique.

While simple classification scores (accuracy, area under receiver operating curve (AUROC), F1 score, etc.) are readily used to assess the quality of a classification model, the success of a segmentation is typically judged using a similarity metric quantifying how close a predicted segmentation is to the ground truth. The most common metric, intersection over union ("IoU") or Jaccard score, quantifies the degree of overlap between the prediction P and the ground truth T:

$$IoU = \text{Jaccard score} = \frac{P \cap T}{P \cup T}$$

Precision represents the proportion of pixels classified as positive (e.g., as disease pixels) that are, in fact, positive while recall (or sensitivity) corresponds to the proportion of all positive pixels correctly classified as such. In terms of true positives (TP), false positives (FP), and false negatives (FN), $$\text{Precision} = \frac{TP}{TP + FP}$$
$$\text{Specificity} = \frac{TN}{TN + FP}$$
$$\text{Recall} = \frac{TP}{TP + FN}$$

First predictor 15 is biased toward specificity or, more typically, precision. This may be achieved in various ways. One embodiment employs a relatively high confidence threshold (e.g., 0.3 or higher on a scale of 0 to 1) for detection; only detected objects with prediction probabilities at least equal to the confidence threshold are retained. These may be further reduced in number, and precision thereby enhanced, by reduction techniques such as non-maximum suppression (nms). When the threshold-exceeding predictions of multiple object-detection systems are combined, they may be fused to reduce their number using a combination technique such as weighted boxes fusion or soft nms.

Alternatively or in addition, precision or specificity may be enhanced by expanding the training image set and/or using data augmentation to train the predictor on more data. Image preprocessing can also enhance precision or specificity by removing noise, e.g., using equalization (such as CLAHE) or contrast enhancement, either on training images, candidate test images, or both. Still another approach, if first predictor 15 is configured to analyze subimage tiles, is to sift both training and test tiles (i.e., tiles derived from training and candidate images, respectively) using image entropy or another visual criterion in order to eliminate tiles unlikely to represent ROI regions before they are examined by predictor 15. This approach is described further below. During training, learning hyperparameters can also be varied or tuned to improve precision.

In some embodiments, instead of (or in addition to) using an ensemble of predictor architectures, multiple instances of the same architecture may be trained on different sets of images; this eliminates some of the random error associated with each training instance. The different sets of images may be completely different, i.e., each set may consist of images not found in any other set. In other cases, the sets have some images in common in the manner of cross-validation folds. For example, each training set may include a collection of training images and a (usually smaller) collection of validation images; as a predictor is trained, performance is gauged against the validation images or tiles derived therefrom. In such cases, the sets may be organized so that they have training images in common but no validation images in common. The number of training images any training set has in common with any other training set may be capped (e.g., at 10%, 20%, 25%, or 30%) to avoid excessive redundancy, i.e., so the predictors trained on the different training sets exhibit different classification behavior. Using an ensembling technique such as weighted boxes fusion and a high confidence level and/or strict (e.g., nms) object-selection criterion will ensure that the surviving object detections will exhibit high precision.

In general, first predictor 15 produces precision scores above 0.5, e.g., above 0.6, 0.7, 0.8, 0.9, 0.95, or 0.99.

In the second processing branch, source image 122 is analyzed by second predictor 25 also shown in FIG. 1A. Depending on its size, source image 122 may first be processed by a tiler module 124 to produce a plurality of subimage portions (or "tiles") 128 of the source image; tiles 128 are sized for processing by predictor 25, which may be a CNN, and may overlap based on a user-specified overlap factor. Tiles 128 may be stored in a storage device 104 along with coordinates specifying their locations in source image 122. Alternatively, if source image 122 is small enough, it may be analyzed by second predictor 25 directly.

In some embodiments, an analyzer 130 sifts subimages 128 according to a visual criterion, as described in greater detail below, to identify the subimages 133 that satisfy the criterion. In other embodiments, all subimages are used. The qualifying (or all) subimages 133 are analyzed by predictor 25, which, as discussed below, is biased toward sensitivity or recall. Predictor 25 may be a CNN trained for the classification task of interest to produce predictions (e.g., probability values) indicative of a classification. Second predictor 25 may be straightforwardly implemented without undue experimentation. Suitable architectures include VGG16, ResNet50, ResNet101, EfficientNet, U-Net, and the five-layer CNN architecture described in Frank, "Resource-frugal classification and analysis of pathology slides using image entropy," Biomedical Signal Processing and Control, 66:102388 (April 2021), the contents of which are incorporated by reference herein. Alternatively, the classifier may be an autoencoder paired with a hyperplane classifier such as a multilayer perceptron or a support vector machine. The autoencoder learns a representation (encoding) for the sifted tiles at a dimensionality low enough for classification using a hyperplane classifier. To achieve dimensionality reduction, the autoencoder is trained to ignore insignificant data. See, e.g., Zeggada et al., "Multilabeling UAV images with Autoencoder networks," *Proc. of* 2017 *Joint Urban Remote Sensing Event*, DOI:10.1109/JURSE.2017.7924544, the entire disclosure of which is hereby incorporated by reference. Other suitable classifiers include random-forest classifiers, classifiers based on clustering (such as K-means or K-medoids), minimum-distance classifiers, maximum-likelihood classifiers, and decision-tree classifiers. For ease of presentation, the ensuing discussion presumes use of a CNN classifier, it being understood that alternatives known to those of skill in the art are within the scope of the invention.

Predictor 25 computes a classification probability for each examined subimage 133 and is biased toward sensitivity or recall, at least to achieve higher recall levels than first predictor 15. This may be achieved in various ways. In one embodiment, the decision boundary that will trigger rendering of a pixel in the final probability map is set below the decision boundary used for training; this will cause pixels associated with less-certain predictions to be rendered and thereby enhance recall, usually at the price of reduced precision. In another embodiment, as described in U.S. Ser. No. 17/871,878 (filed on Sep. 14, 2022 and hereby incorporated by reference), probabilities assigned to the same tile by the differently trained predictors may be subjected to a function associated with a similarity metric. For recall, the function can be selection of the highest probability among the predictions. When tile-level probabilities are averaged at the pixel level, recall is enhanced because the least conservative prediction probabilities were selected at the tile level. The mechanics of pixel-level probability averaging and map generation are described below.

During training, learning hyperparameters can be varied or tuned to improve recall. In general, second predictor 25 produces recall scores above 0.5, e.g., above 0.6, 0.7, 0.8, 0.9, 0.95, or 0.99.

It should be noted that the tiling and selection approach (instead of or in addition to object detection) following differential training may also be used for first predictor 15. For precision, the function can be selection of the lowest probability. When tile-level probabilities are averaged at the pixel level, precision is enhanced because the most conservative probabilities were selected at the tile level.

A mapping module 140 builds a classification map 145 by computing the average probability associated with each classified pixel across all subimages that include that pixel, or otherwise combining pixel-level probabilities. So long as second predictor 25 is reasonably well calibrated—i.e., the predicted probabilities correspond approximately to true likelihoods—the pixel-level probabilities will be accurate (and contributions from multiple tiles will reduce error). From classification map 145, mapping module 140 generates the probability map 148 based on the final probability value of each classified pixel and the color associated with that value, and from the bounding boxes, contours or pixels generated by first predictor 15. Because only part of the original source image may have associated probability levels (e.g., not all subimages satisfy the visual criterion if one is employed), it may be useful for probability map 148 to represent source image 122 as a grayscale (or line or other monochromatic) image with colors overlaid translucently, e.g., one color corresponding to the high-probability ROIs 20 provided by first predictor 15 and a second color corresponding to the lower-probability ROIs 30 provided by second predictor 25. This is straightforwardly implemented in accordance with well-known techniques.

This two-color strategy draws initial attention to the regions where disease, abnormality or other condition of interest is most likely present. If disease exists, the largest amount will probably be found in the high-probability regions, and because these are marked with high precision, their review is highly targeted. If no abnormalities are found there, or if no high-probability regions 20 have been identified, the reviewing clinician can move on to the lower-probability, high-recall ROIs 30. Combined with the ability to toggle between the probability map and a congruent display of the source image as described, for example, in the '878 application and U.S. Ser. No. 18/122,390 (filed on Mar. 16, 2023 and incorporated herein by reference), and with translucent colors, this approach may case the burden of reviewing an image without sacrificing the ability to conveniently inspect all relevant anatomy. On a touchscreen device, both images—the probability map and the congruent source image—may be stretched and squeezed even though only one image at a time is viewed.

Classification map 145 and probability map 148 may be stored in memory 106 as data arrays, image files, or other data structure(s), but need not be distinct. Instead, probability map 148 may be generated directly from the source image (e.g., in grayscale format) and average (or otherwise combined) pixel-level classification probabilities as these are computed—i.e., the probability and classification maps may be the same map.

In one embodiment, tiler 124 (which supports second predictor 25 and, in some cases, first predictor 15) generates subimage tiles 128 of specified dimensions from a source image 122 by successive identification of vertically and horizontally overlapping tile-size image regions. The Python Imaging Library, for example, uses a Cartesian pixel coordinate system, with (0,0) in the upper left corner. Rectangles are represented as 4-tuples, with the upper left corner given first; for example, a rectangle covering all of an 800×600 pixel image is written as (0, 0, 800, 600). The boundaries of a subimage of width=w and height=h are represented by the tuple (x, y, x+w, y+h), so that x+w and y+h designate the bottom right coordinate of the subimage.

Figure 2:
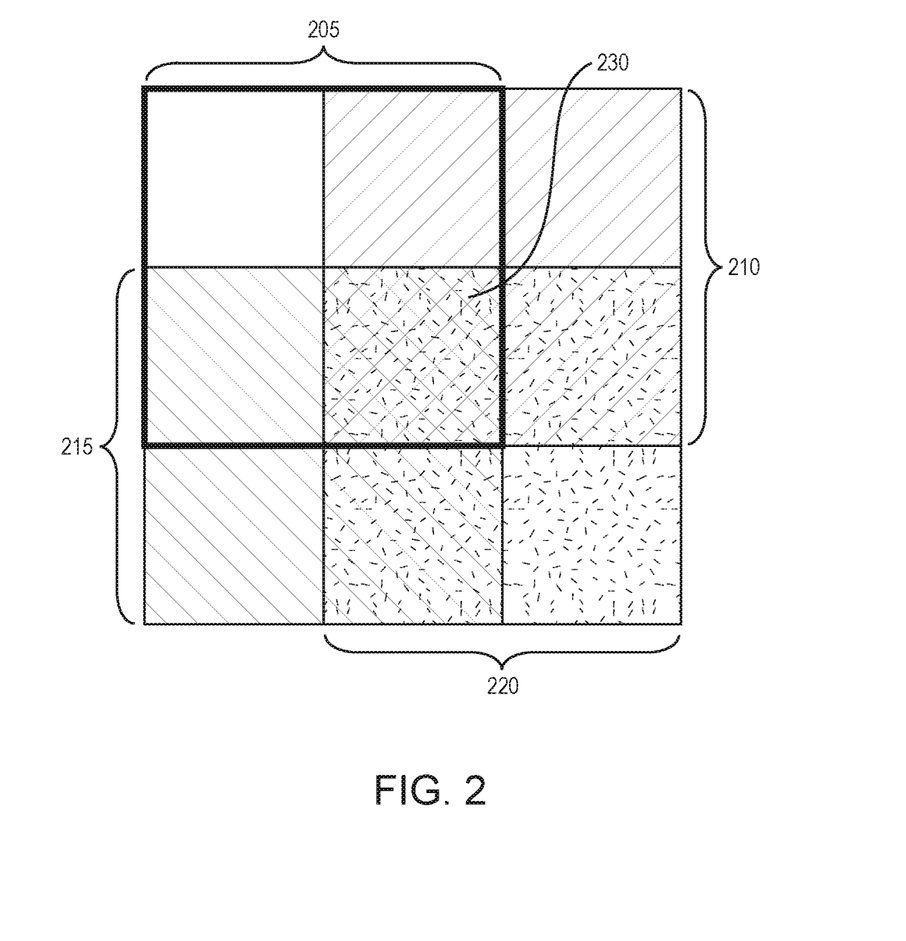
FIG. 2 illustrates two-dimensional overlap among subimages.

The tile overlap factor may be defined in terms of the amount of allowed overlap between vertically or horizontally successive subimages; hence, an overlap factor of ½ results in 50% vertical or horizontal overlap between consecutive subimages. This is illustrated in FIG. 2. Tile pairs 205, 210 and 215, 220 have 50% horizontal overlap (with the border of tile 205 being emphasized for clarity). In addition, tile pair 215, 220 has 50% vertical overlap with tile pair 205, 210. This two-dimensional overlap results in a central region 230 where all four tiles 205, 210, 215, 220 overlap and may contribute, by averaging or other combination, to a classification probability. The greatest number of overlapping images occupy the central region 230, which, as overlap increases, diminishes in size but increases in terms of the number of contributing subimages. More importantly, increasing overlap means that more of the area of any single tile will overlap with one or more other tiles, so that more pixels of any tile will receive probability contributions from other tiles with consequent reduction in classification error; consequently, if only a minority of tiles are misclassified, the effect of overlap by properly classified tiles will overwhelm the misclassification error and the resulting probability map will have high accuracy. Typical overlap factors exceed 50%, e.g., 60%, 70%, 80%, or even 90% or more along both dimensions.

The optimal tile size may be determined for a particular application by testing various tile sizes to find the best-performing size. Medical images, particularly very large (e.g., histology or pathology) images, may be preliminarily rescaled to a smaller size. This permits tiles within the previously noted working range to cover an adequately large portion of the depicted anatomy to provide accurate classifications. At the same time, the rescaled image must preserve sufficient anatomic detail. These steps—initial image rescaling followed by trials at multiple tile sizes—provide two "knobs" for overall optimization, which may be achieved for a given application without undue experimentation. As described below, the image rescalings optimal for segmentation and classification tasks may differ.

Once the tiles are generated, they may be sifted in accordance with a visual criterion with the objective of eliminating tiles that are not meaningful for classification. In one embodiment, the visual criterion is image entropy. From the purview of information theory, image entropy represents the degree of randomness (and therefore information content) of the image pixel values, just as the entropy of a message denotes (as a base-2 log) the amount of useful, nonredundant information that the message encodes:

$$H = -\sum_{k} p_k \log_2(p_k)$$

In a message, $p_k$ is the probability associated with each possible data value k. For an image, local entropy is related to the complexity within a given neighborhood, sometimes defined by a structuring element such as a circular or square region, or the entire image. Thus, the entropy of a grayscale image (or one channel of a color (e.g., RGB) image) can be calculated at each pixel position (i,j) across the image. To the extent that increasing image entropy correlates with increasingly rich feature content captured in the convolutional layers of a CNN, it provides a useful basis for selecting tiles. In one implementation, only those tiles whose entropies equal or exceed the entropy of the whole image are retained. Although no subimage will contain as much information content as the original, a subimage with comparable information diversity may pack a similar convolutional punch, so to speak, when processed by a CNN. In some embodiments, depending on the distribution of tile entropies, the discrimination criterion may be relaxed in order to increase the number of qualifying tiles. Because of the logarithmic character of the entropy function, even a slight relaxation of the criterion can result in many more qualifying tiles. For example, the criterion may be relaxed by 1% (to retain tiles with image entropies equal to or exceeding 99% of the source image entropy), or 2%, or 3%, or 4%, or 5%, or up to 10%. Tile sifting using image entropy is further described in Frank et al., "Salient Slices: Improved Neural Network Training and Performance with Image Entropy," *Neural Computation*, 32(6), 1222-1237 (2020), which is incorporated by reference herein.

Another suitable approach to tile sifting uses a background threshold criterion, retaining only tiles with a proportion of background below a predetermined limit. Images of pathology slides, for example, typically have white or near-white backgrounds. But the tissue of interest may also have white features, gaps or inclusions. Hence, while the presence of any background can adversely affect training and classification accuracy, eliminating all tiles containing regions that might potentially be background risks discarding anatomy critical to classification. Hence, the minimum background threshold is generally set at 50% or higher, e.g., 60%, 70%, 80%, or even 90%; the optimal threshold depends on the amount of background-shaded area that may appear in non-background regions.

One approach to background identification and thresholding is to convert a colored tile to grayscale and count pixels with color values corresponding to background, e.g., white or near-white pixels. For example, an RGB image has three color channels and, hence, three two-dimensional pixel layers corresponding to red, blue, and green image components. In an eight-bit grayscale image, a pixel value of 255 represents white. To allow for some tonal variation from pure white arising from, for example, the source imaging modality, any pixel in any layer with a value above, e.g., 240 may be considered background. Summing the number of such pixels and dividing by the total number of pixels yields the background fraction. Only tiles with background fractions below the predetermined threshold (typically from 0.1 to 0.5, depending on the image characteristics) are retained.

This approach may not be suitable for tiles based on images that have been subjected to stain normalization, which reduces the color and intensity variations present in stained images from different laboratories, since the background may be shifted too far away from white. In such cases, it may be preferable to threshold tiles based on the number of identically valued pixels rather than their proximity to white or black extremes. Pixel value frequency may be obtained, for example, as an occurrence list (using, e.g., the NumPy "unique" function) specifying pixel values and their populations within the tile, and if the maximum occurrence level exceeds the threshold fraction, the tile is rejected. In some embodiments, the first n occurrence levels are summed and compared to the threshold, where n is desirably large enough to ensure that all pixels corresponding background regions are included in the count. The value of n may be straightforwardly determined by, for example, examining background regions of representative source images or tiles determine the number of associated pixel values (e.g., once again using the NumPy "unique" function), or alternatively, by simply experimenting with candidate values and examining the tiles characterized as background and non-background, selecting the value that excludes all background tiles and a minimum number of non-background tiles. In practice, n typically ranges from 2 to 5.

Still another suitable visual criterion is image density. If regions of interest for classification purposes are known to have image densities above a minimum, that minimum may be used as a discrimination threshold to sift tiles. In yet other embodiments, the visual criterion is functionally defined— e.g., discriminating between a sample and the background glass slide—and may be implemented using machine learning, e.g., a neural network trained to make the functional distinction.

In some implementations, it is unnecessary to sift tiles using a visual criterion because the predictor is robust enough to make accurate predictions across all images or tiles, or because the images themselves contain little noise or extraneous visual information that could produce erroneous classifications. In general, sifting is not performed if its computational cost outweighs the performance benefits derived therefrom. All tiles, in such cases, are "qualifying tiles."

With renewed reference to FIG. 1B, once qualifying tiles 133 have been identified and stored in volatile and/or nonvolatile storage, they are used either to train a predictor or are presented to a trained predictor as candidate images for classification. For case of presentation, the following discussion will focus on second predictor 25, it being understood that the tiling approach may also be used for first predictor 15. As noted, the output of second predictor 25 is generally a classification probability. In some instances, the classification is binary (e.g., cancerous or benign, adenocarcinoma or squamous cell carcinoma, etc.) and the decision boundary lies at 0.5, so that output probabilities at or above 0.5 correspond to one classification and output probabilities below 0.5 reflect the other classification. In other instances, there are multiple output classifications and a "softmax" activation function maps CNN output probabilities to one of the classes.

Consider, for example, binary classification of a histology slide that may contain either or both of two types—"type 1" and "type 2"—of cancerous tissue. The slide, possibly after initial resizing (e.g., downsampling to a lower resolution), is decomposed into overlapping subimages 133, which may be sifted as described above. The subimages are thereupon processed by second predictor 25, which has been trained to distinguish between type 1 and type 2 cancers. Second predictor 25 assigns a classification probability p to each subimage, with probabilities in the range $0.5 \leq p < 1.0$ corresponding to type 1 and probabilities in the range $0 < p < 0.5$ corresponding to type 2. Each individual subimage may contain only a small amount of type 1 or type 2 tissue, yet the entire subimage receives a unitary probability score. As a result, the score assigned to an individual subimage may be skewed so as, for example, to ignore type 1 and/or type 2 tissue that is present but in too small a proportion to trigger the proper classification. With sufficient overlap and pixel-level averaging, this classification error will be mitigated as overlapping subimages containing progressively greater proportions of the type 1 and/or type 2 tissue contribute to the average pixel-level probabilities.

In various embodiments, a pixel-level probability map of tiles generated by second predictor 25 is defined to reflect average probabilities across all subimages classified by the second predictor. For example, in Python, a 3D m×n×d NumPy array of floats may be defined for an m×n source image, with the parameter d corresponding to the number of classified subimages (which were identified as satisfying a visual criterion). At each level d, the array is undefined or zero except for the region corresponding to one of the classified subimages, and all array values in that 2D region are set to the classification probability computed for the subimage. The probability map is an m×n array, each value [i,j] of which is equal to some combination of all nonzero values [i,j,d:] of the 3D array, e.g., the average of all nonzero values [i,j] over the d-indexed axis. The greater the degree of subimage overlap, the deeper the number of nonzero values will extend through the d-indexed axis and, therefore, the more probability values (from overlapping subimages) that will contribute to the combined value at any point of the probability map, enhancing classification accuracy for that point. Points in the probability map corresponding to points in the 3D array with no nonzero values over the d-indexed axis—i.e., where the source image lacked sufficient image entropy to generate a subimage satisfying the criterion—may be left undefined.

The probability map generated by second predictor 25, therefore, is a map of pixelwise classification probabilities. The probability map may be dense (i.e., have values over most of the source image) or sparse (with relatively few defined values) depending on the amount of visual diversity in the source image and the number of qualifying tiles left after sifting. Pathology images, for example, vary markedly in visual density and may be dense or sparse.

The system 100 may also be capable of discriminating among abnormalities (e.g., disease types or subtypes) in the ROIs. For example, second predictor 25 may be trained to distinguish among a plurality of disease types or subtypes, or alternatively, second predictor 25 may only distinguish generally between diseased and undiseased (e.g., tumor and non-tumor) tissue and another predictor is trained to distinguish among two or more disease types or subtypes in tissue known to be diseased. This approach recognizes that the image and tile sizes for distinguishing diseased and undiseased tissue may be different from the image and tile sizes optimal for classifying disease subtypes. In one implementation, segmentation training images are prepared using segmentation masks that occlude undiseased portions of an image. These "ground truth" masks may be generated manually, by trained pathologists, or in an automated fashion. The masks allow the diseased portions of a medical image to be extracted, and tiles from just this region may be prepared as described above (e.g., without regard to a visual criterion). The maximum and minimum entropies associated with these tiles may be obtained and noted, and used as described below. Next, the segmentation masks are inverted and comparative tiles generated from the undiseased image regions. The tiles drawn from diseased and undiseased regions are treated as separate classes and used to train a segmentation CNN. This procedure is repeated over multiple images scales and tile sizes to find an optimal combination that produces best (e.g., highest accuracy or lowest loss) CNN performance in distinguishing disease tiles from non-disease tiles. The best-performing segmentation CNN, thus trained using the optimal combination of image rescaling and tile size, may then be used to generate segmentations from candidate images.

The maximum and minimum entropies of tiles derived from disease-only images may be treated as boundaries or "rails" within which tiles from a candidate image must fall in order to qualify as usable. Sifting in accordance with this criterion preliminarily eliminates tiles unlikely to correspond to diseased tissue. Thus, a medical image to be classified and/or mapped may be downsampled, tiled, and the tiles sifted using the previously established entropy boundaries, which serve as a preprocessing check to exclude normal tissue tiles that might have been misclassified as disease tiles.

A similar procedure of optimization and training is undertaken to train a CNN to classify disease types or subtypes. Here only tiles drawn from disease regions are used for training. The training images are organized into sets corresponding to the types or subtypes of interest and the ground-truth segmentation masks used to isolate the disease regions. The different types or subtypes are treated as different classes for training purposes, and tiles drawn from the disease regions are used to train a CNN to distinguish among the types or subtypes. The optimal image rescaling and tile size for classification may or may not be the same as those supporting segmentation.

Similarly, though more simply, first predictor 15 may be trained not only to identify high-probability ROIs but also classify them in terms of subtype (e.g., malignant vs. benign masses or different cancer subtypes).

The foregoing approach may be used to rank images for clinician review, in addition to or even in lieu of creating segmentation maps. As the number of expert clinicians remains static or dwindles while patient demand for radiology and pathology services continues to grow, the ability to triage or otherwise prioritize images for review becomes increasingly important. Many healthcare institutions have internal policies that impose review deadlines for the most serious cases.

Once high-precision and high-recall regions of an image have been identified, they may be used to rank the review priority of the image against that of other analyzed images. Numerous strategies may be used in different degrees of refinement to establish the clinical urgency of images to be reviewed. In general, the objective is to rank images according to a level of suspicion or degree of severity, and frequently these criteria will overlap or be identical. In general, images may be compared based on pixel counts of high-precision regions and high-recall regions; as noted above, where a pixels is identified by both predictors 15, 25, it is typically classified as high-precision. One approach accords high-precision regions a higher score than high-recall regions; that is, the pixels of all suspicious regions are counted and the high-precision pixels are multiplied by a weighting factor. In another approach, images with any high-precision regions are ranked above images without such regions, regardless of the relative numbers of pixels. The greater the differential performance between high-precision and high-recall regions in indicating a disease or condition—that is, the greater the relative precision and/or specificity of the high-precision regions relative to the high-recall regions—the more attractive this strategy will be. Secondarily, images that include high-precision regions may be ranked based on high-precision pixel counts or by the number of distinct regions. If, for example, the presence of multiple disease regions has greater clinical importance than the presence of a single large disease region, an image with multiple small, discrete high-precision regions may be ranked above an image with fewer high-precision regions even if the high-precision pixel count is higher in the latter image. If the gross amount of disease is more important clinically than its distribution, then straight pixel counts of high-precision regions may be used to rank images. In images with no high-precision regions, ranking may be based on straight pixel counts of high-recall regions, or the counts may be weighted based on the number of discrete regions in an image.

The foregoing discussion presumes a set of 2D images such as mammograms. The ranking approach described herein may also be applied to 3D images. One type of 3D image is a tomographic image, which comprises or consists of a series of slices through the anatomy under study; for example, a 3D mammogram (or tomosynthesis) contains a series of sectional images of the patient's breast obtained along an imaging axis. Most simply, the foregoing techniques can be applied individually to 2D tomographic slices, which may be ranked according to the amount of high-precision and high-recall ROIs detected. Moreover, multiple 3D images may themselves be ranked based on, for example, the numbers of high-precision and high-recall pixels in the highest-ranked slice of each 3D image or across the entire 3D image or, alternatively or in addition, the number of discrete regions of each type that are detected in the highest-ranked slice or across the entire 3D image. The number of slices in which high-precision regions are detected may itself be a factor in ranking; for example, the more slices an anatomic feature spans, the more clinically significant the feature may be. Similarly, the number of discrete high-precision features detected throughout a 3D image may be more clinically important than the size of a single high-precision feature in a particular slice or contiguous group of slices.

Tomographic and similar imaging modalities can also be used to create fully 3D images of anatomic features; thus, whereas computed tomography (CT) scans consist of slices, a 3D image is a solid volume that may be rotated and translated onscreen in three apparent dimensions. For example, a series of low-dose X-ray projections may be acquired in a circular trajectory around a patient's breast, followed by CT image reconstruction to provide a 3D breast volume. (See, e.g., O'Connell et al., "The potential role of dedicated 3D breast CT as a diagnostic tool: Review and early clinical examples," *Breast J.* 2014 November; 20(6): 592-605, incorporated herein by reference.) The imaged volume is typically represented by volumetric pixels ("voxels") defined by the tomographic reconstruction. The foregoing ranking techniques may be applied to a 3D voxel image by defining 2D slices through the 3D image and analyzing each slice as discussed above. These slices can be taken along any desired axis, or along more than one axis. The slices may correspond to adjacent 2D layers, or the 2D layers may be spaced apart. For example, if the voxel dimension (in mm$^3$) is d, but the smallest diagnostic feature of interest can be no smaller than 3d, it is safe to extract and analyze every third 2D layer along the axis of interest for diagnostic purposes. On the other hand, by analyzing substantially all 2D layers along an axis, the 3D tomographic reconstruction can be augmented to highlight detected ROIs in three dimensions; for example, voxels lying within detected regions may be labeled and rendered in accordance with the labels. As described above, embodiments of the invention may be used to detect high-precision and high-recall ROIs, which may be colored or otherwise marked in the 3D reconstruction. As is known in the art, the 3D reconstruction may be viewed as a solid image that can be sliced arbitrarily, showing sectional anatomic detail, or as a partially transparent 3D image in which only certain features are rendered within the depicted volume. In the latter case, high-precision and high-recall ROIs may be shown as, for example, red and yellow volumes within, e.g., an otherwise transparent contour outline of the breast. If efficiency considerations preclude analysis of all 2D layers within a volume of interest, layers can be skipped and the omitted regions filled by interpolation so long as the analyzed layers are close enough together to avoid the possibility of missing diagnostically relevant features. The 3D images themselves may be ranked in terms of review priority using the approach described above in connection with tomographic images.

The image rankings may be organized in a data structure. The data structure may be a list, a linked list, an array, a stack, a queue, a tree, a graph, a JSON file, etc. Each entry identifying an image may include or reference a link (e.g., a hyperlink) to the associated image, enabling the ranked order of images to be visualized and the images retrieved individually or in groups via the links.

In general, it is noted that computers typically include a variety of computer-readable media that can form part of system memory and be read by the processing unit. By way of example, and not limitation, computer-readable media may take the form of volatile and/or nonvolatile memory such as read-only memory (ROM) and random access memory (RAM). A basic input/output system (BIOS), containing the basic routines that help to transfer information between elements, such as during start-up, is part of operating system 120 and is typically stored in ROM. RAM typically contains data and/or program modules that are immediately accessible to and/or presently being operated on by CPU 110. Operating system 110 may be or include a variety of operating systems such as Microsoft WINDOWS operating system, the UNIX operating system, the LINUX operating system, the MACINTOSH operating system, the APACHE operating system, or another operating system platform.

Any suitable programming language may be used to implement without undue experimentation the analytical functions described above and in the attached paper. Illustratively, the programming language used may include without limitation, high-level languages such as C, C++, C#, Java, Python, Ruby, Scala, and Lua, utilizing, without limitation, any suitable frameworks and libraries such as TensorFlow, Keras, PyTorch, or Theano. Further, it is not necessary that a single type of instruction or programming language be utilized in conjunction with the operation of the system and method of the invention. Rather, any number of different programming languages may be utilized as is necessary or desirable. Additionally, the software can be implemented in an assembly language and/or machine language.

CPU 108 may be a general-purpose processor, e.g., an INTEL CORE i9 processor, but may include or utilize any of a wide variety of other technologies including special-purpose hardware, such as GPU 110 (e.g., an NVIDIA 2070), a microcontroller, peripheral integrated circuit element, a CSIC (customer-specific integrated circuit), ASIC (application-specific integrated circuit), a logic circuit, a digital signal processor, a programmable logic device such as an FPGA (field-programmable gate array), PLD (programmable logic device), PLA (programmable logic array), smart chip, or any other device or arrangement of devices that is capable of implementing the steps of the processes of the invention. In some embodiments, all of the operations—decomposing a source image (typically downscaled if the original is very large, e.g., a "whole slide" pathology image) into tiles, sifting the tiles in accordance with a visual criterion, generating classification probabilities for the sifted tiles, and creating a segmentation map)—are performed on a single device, e.g., a mobile device such as a tablet or "smart phone" implementing, for example, the iOS operating system supplied by APPLE Inc. or the ANDROID operating system supplied by GOOGLE Inc. In other embodiments, some operations (such as CNN analysis of tiles) may be performed by an external device, such as a "cloud" server in communication, via the internet, with a local device. For example, a source image may be rescaled by one cloud server, the rescaled (smaller) image inspected on a local device, and the analysis and map generation performed on a different cloud server. The distribution of functionality among devices is arbitrary and may depend on design preference and constraints.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A method of computationally generating a digital map image from a three-dimensional (3D) digital source medical image comprising first and second different tissue types, the method comprising the steps of:
    computationally training first and second predictors to distinguish between the first and second tissue types, wherein the first predictor has a greater precision than the second predictor and the second predictor has a greater sensitivity than the first predictor;
    analyzing at least a portion of a plurality of two-dimensional (2D) layers of the source image using the first predictor to computationally determine whether the second tissue type is present in any of the analyzed layers;
    analyzing at least a portion of the plurality of 2D layers of the source image using the second predictor to computationally determine whether the second tissue type is present in any of the analyzed layers; and
    for each analyzed 2D layer, rendering regions on the source image corresponding to the second tissue type detected by the first predictor or the second predictor to produce the digital map image, regions identified by the first predictor taking precedence over regions identified by the second predictor.

2. The method of claim 1, wherein the 2D layers are slices of a tomographic 3D image.

3. The method of claim 1, wherein the 2D layers are slices of a 3D voxel array.

4. The method of claim 1, wherein regions identified by the first predictor are rendered so as to be visually differentiated from regions identified by the second predictor.

5. The method of claim 1, wherein the first predictor comprises a neural network configured for object detection.

6. The method of claim 1, wherein the second predictor comprises a convolutional neural network.

7. The method of claim 1, further comprising the step of ranking the 2D layers based at least in part on pixel counts of regions identified by the first and second predictors.

8. The method of claim 7, further comprising the steps of:
    repeating the analyzing steps for a plurality of 3D source images; and
    thereafter, ranking the 3D digital source images based at least in part on pixel counts of regions identified by the first and second predictors in the 2D layers of the 3D source images.

9. An image-processing system for computationally generating a digital map image from a three-dimensional (3D) digital source medical image comprising first and second different tissue types, the system comprising:
    a processor;
    a computer memory;
    an image buffer for storing a source image; and
    first and second predictors executable by the processor and trained to distinguish between the first and second tissue types, wherein the first predictor has a greater precision than the second predictor and the second predictor has a greater sensitivity than the first predictor,
    wherein the processor is configured to generate the digital map image by (i) causing the first and second predictors to analyze at least a portion of a plurality of two-dimensional (2D) layers of the source image and computationally determine whether the second tissue type is present in any of the analyzed layers, and (ii) for each analyzed 2D layer, rendering regions on the source image corresponding to the second tissue type detected by the first predictor or the second predictor to produce the digital map image, regions identified by the first predictor taking precedence over regions identified by the second predictor.

10. The system of claim 9, wherein regions identified by the first predictor are rendered so as to be visually differentiated from regions identified by the second predictor.

11. The system of claim 9, wherein the first predictor comprises a neural network configured for object detection.

12. The system of claim 9, wherein the second predictor comprises a convolutional neural network.

13. The system of claim 9, wherein the processor is further configured to rank the 2D layers based at least in part on pixel counts of regions identified by the first and second predictors.

14. The system of claim 13, wherein the processor is further configured to analyze a plurality of 3D source images and rank them based at least in part on pixel counts of regions identified by the first and second predictors in the 2D layers of the plurality of 3D source images.

15. A method of computationally analyzing a plurality of digital source medical images at least some of which are three-dimensional (3D) digital source medical images each comprising tissue including first and second different tissue types, and, based thereon, assigning a priority to and within each of the 3D source images, the method comprising the steps of:

analyzing at least a portion of a plurality of two-dimensional (2D) layers of each 3D source image using a first predictor, trained to distinguish between the first and second tissue types, to computationally whether the second tissue type is present in any of the analyzed layers;

analyzing at least a portion of a plurality of two-dimensional (2D) layers of each 3D source image using a second predictor, trained to distinguish between the first and second tissue types, to computationally whether the second tissue type is present in any of the analyzed layers, wherein the first predictor has a greater precision than the second predictor, the second predictor has a greater sensitivity than the first predictor;

for each 3D source image, computationally ranking the analyzed 2D layers thereof based at least in part on pixel counts of regions identified by the first and second predictors;

computationally ranking the 3D source images based at least in part on pixel counts of regions identified by the first and second predictors in the 2D layers of the 3D source images; and generating a data structure including at least some of the rankings.

16. The method of claim 15, wherein the rankings depend primarily on a pixel count of regions identified by the first predictor and secondarily on a pixel count of regions identified by the second predictor.

17. The method of claim 15, wherein a weighting factor is applied to at least one of the pixel counts.

18. The method of claim 15, wherein images with any regions identified by the first predictor are ranked above images without such regions.

19. The method of claim 15, wherein layers or images that include regions identified by the first predictor are ranked based on a total number of pixels identified by the first predictor or by a number of distinct regions identified by the first predictor.

20. The method of claim 15, wherein layers or images that do not include regions identified by the first predictor are ranked based on a total number of pixels identified by the second predictor.

* * * * *